A. R. PRITCHARD.
TUBULAR LANTERN.
APPLICATION FILED SEPT. 18, 1911.
1,015,398.
Patented Jan. 23, 1912.
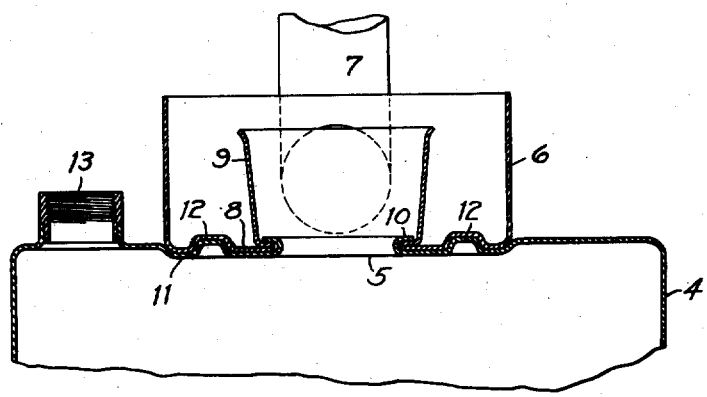
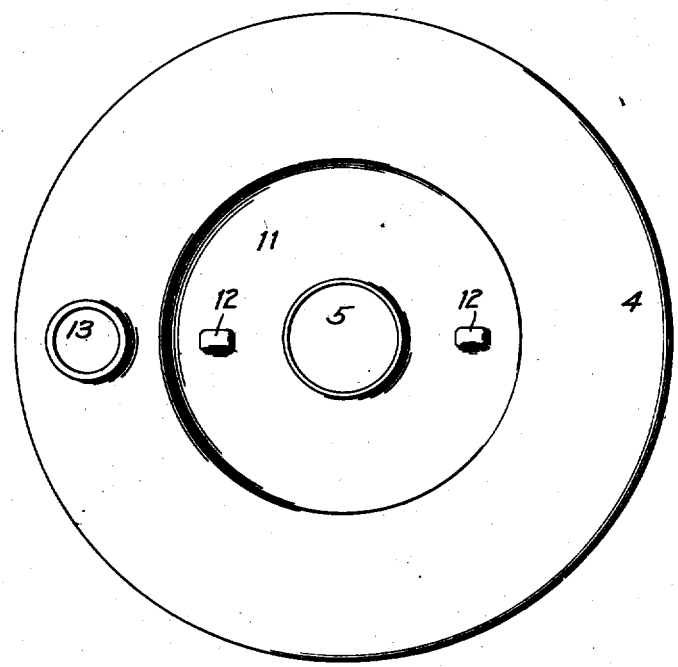
Witnesses:
Clarence W. Carroll
D. Gurnee
Inventor:
Albert R. Pritchard
by his attorneys
Osgood, Davis & Dorsey

UNITED STATES PATENT OFFICE.

ALBERT R. PRITCHARD, OF ROCHESTER, NEW YORK.

TUBULAR LANTERN.

1,015,398.  Specification of Letters Patent.  Patented Jan. 23, 1912.

Application filed September 18, 1911. Serial No. 649,897.

*To all whom it may concern:*

Be it known that I, ALBERT R. PRITCHARD, a citizen of the United States, and resident of Rochester, in the county of Monroe and State of New York, have invented certain new and useful Improvements in Tubular Lanterns, of which the following is a specification.

This invention relates to tubular lanterns in which the air-chamber is so formed that it may be locked to both the oil-font and the burner-cup by a single seam.

The object of the invention is to facilitate the manufacture of lanterns of this type, and to this end I employ coöperating projections and recesses on the air-chamber and the oil-font, by which the air-chamber is accurately positioned in proper relation to the oil-font during the manufacture of the lantern.

In the accompanying drawings:—Figure 1 is a vertical, median section of a portion of a tubular lantern embodying the present invention; and Fig. 2 is a plan-view of the oil-font.

As the invention is applicable to any tubular lantern having the usual general form, only a portion of the lantern is shown in the drawings, this portion including the oil-font, the air-chamber, the air-tubes and the burner-cup.

The oil-font 4 may be of any ordinary or suitable form, and it is provided with the usual central opening 5 to receive the wick. The air-chamber 6 is also illustrated as of the usual cylindrical form, and the air-tubes 7 are connected at their lower ends with the air-chamber in the usual manner.

The air-chamber is provided with a flat bottom-portion 8, which extends inwardly from the cylindrical body of the air-chamber so that its inner edge is adjacent the opening 5 in the oil-font. This air-chamber may be conveniently formed by drawing a piece of flat sheet-metal to the required form.

The burner-cup 9 is illustrated as of the usual tapering form so as to receive and retain the burner frictionally. After assembling the parts in the proper position the margin of the metal forming the top of this oil-font is rolled upwardly and outwardly to form a seam. This seam locks the burner-cup in position in the usual manner, but owing to the inward extension of the bottom 8 of the air-chamber the edge of this portion of the air-chamber is also locked in the same seam, and accordingly all three of these members are secured together at the opening 5 by a single joint, thus providing a positive mechanical lock in addition to such solder or other means as may be used for securing the air-chamber in place.

Owing to the broad surfaces of the air-chamber and the oil-font which are in engagement, I have found that it is unnecessary to employ solder to connect the air-chamber and the oil-font, since the tin upon the adjacent surfaces is sufficient to secure them together. Accordingly, it is necessary only to heat the parts in any convenient manner as, for example, by immersing them in heated tallow, and the heat causes the tin upon the adjacent surfaces to soften and cohere. To facilitate this operation and retain the melted tin between the adjacent surfaces I preferably provide the top of the oil-font with a slightly-recessed portion 11 coextensive with the bottom of the air-chamber, the recess being produced in the operation by which the oil-font is stamped or drawn to shape.

In order that the air-chamber may occupy the proper angular position about the axis of the lantern, that is, the position in which the filling-neck 13 of the oil-font will be midway between the air-tubes, the top of the oil-font and the bottom of the air-chamber are provided with coöperating recesses and projections 12 which insure the proper assembling of the parts, and prevent relative rotation of the parts after they have been seamed together and before and during the sweating operation. These recesses and projections may be stamped in the metal in the course of the operations by which the parts are formed, and, in addition to the function just ascribed to them, they have the further useful function of increasing the area of the contacting surfaces between the air-chamber and the oil-font, and thus strengthening the union between these parts.

I claim:—

1. A tubular lantern having, in combination, an oil-font with an opening in the top, an air-chamber of greater diameter than said opening and having a bottom-portion lying upon the top of the oil-font and extending inwardly to the edge of said opening, and a burner-cup, the adjacent edges of the oil-font, the air-chamber, and the burner-cup being locked together by a single seam around said opening, and the oil-font and the air-chamber being provided with coöperating projections and recesses to prevent relative rotation of these parts.

2. A tubular lantern having, in combination, an oil-font with an opening in the top and a shallow recess surrounding said opening, an air-chamber of a diameter substantially equal to that of said recess and having a bottom-portion seated in the recess and lying flat upon the top of the oil-font, said bottom-portion extending inwardly to said opening, and a burner-cup with inturned lower edge, the margin of the oil-font at said opening being rolled upwardly and outwardly over the adjacent edges of the air-chamber and the burner-cup so as to join all three of said parts with a single seam, and the oil-font and the air-chamber being provided with coöperating projections and recesses to prevent relative rotation of these parts.

ALBERT R. PRITCHARD.

Witnesses:
D. GURNEE,
L. THON.

Copies of this patent may be obtained for five cents each, by addressing the "Commissioner of Patents, Washington, D. C."

---

Correction in Letters Patent No. 1,015,398.

It is hereby certified that in Letters Patent No. 1,015,398, granted January 23, 1912, upon the application of Albert R. Pritchard, of Rochester, New York, for an improvement in "Tubular Lanterns," an error appears in the printed specification requiring correction as follows: Page 1, line 52, for the word "this" read *the;* and that the said Letters Patent should be read with this correction therein that the same may conform to the record of the case in the Patent Office.

Signed and sealed this 20th day of February, A. D., 1912.

[SEAL.]

C. C. BILLINGS,
*Acting Commissioner of Patents.* cup being locked together by a single seam around said opening, and the oil-font and the air-chamber being provided with coöperating projections and recesses to prevent relative rotation of these parts.

2. A tubular lantern having, in combination, an oil-font with an opening in the top and a shallow recess surrounding said opening, an air-chamber of a diameter substantially equal to that of said recess and having a bottom-portion seated in the recess and lying flat upon the top of the oil-font, said bottom-portion extending inwardly to said opening, and a burner-cup with inturned lower edge, the margin of the oil-font at said opening being rolled upwardly and outwardly over the adjacent edges of the air-chamber and the burner-cup so as to join all three of said parts with a single seam, and the oil-font and the air-chamber being provided with coöperating projections and recesses to prevent relative rotation of these parts.

ALBERT R. PRITCHARD.

Witnesses:
D. GURNEE,
L. THON.

Copies of this patent may be obtained for five cents each, by addressing the "Commissioner of Patents, Washington, D. C."

---

Correction in Letters Patent No. 1,015,398.

It is hereby certified that in Letters Patent No. 1,015,398, granted January 23, 1912, upon the application of Albert R. Pritchard, of Rochester, New York, for an improvement in "Tubular Lanterns," an error appears in the printed specification requiring correction as follows: Page 1, line 52, for the word "this" read *the;* and that the said Letters Patent should be read with this correction therein that the same may conform to the record of the case in the Patent Office.

Signed and sealed this 20th day of February, A. D., 1912.

[SEAL.]

C. C. BILLINGS,
*Acting Commissioner of Patents.*

It is hereby certified that in Letters Patent No. 1,015,398, granted January 23, 1912, upon the application of Albert R. Pritchard, of Rochester, New York, for an improvement in "Tubular Lanterns," an error appears in the printed specification requiring correction as follows: Page 1, line 52, for the word "this" read *the;* and that the said Letters Patent should be read with this correction therein that the same may conform to the record of the case in the Patent Office.

Signed and sealed this 20th day of February, A. D., 1912.

[SEAL.]

C. C. BILLINGS,
*Acting Commissioner of Patents.*